(12) United States Patent
Rousseau

(10) Patent No.: US 6,827,304 B2
(45) Date of Patent: Dec. 7, 2004

(54) HAY CHOPPER FOR ANIMAL FEED

(76) Inventor: Victor Rousseau, 591, Route 259 Sud, Ste-Monique, (Québec) (CA), J0G 1N0

( * ) Notice: Subject to any disclaimer, the term of this patent is extended or adjusted under 35 U.S.C. 154(b) by 154 days.

(21) Appl. No.: 10/228,370

(22) Filed: Aug. 23, 2002

(65) Prior Publication Data

US 2004/0035965 A1 Feb. 26, 2004

(51) Int. Cl.[7] ............................................. B02C 19/12
(52) U.S. Cl. ......................... 241/73; 241/243; 241/605
(58) Field of Search .............................. 241/73, 186.4, 241/189.1, 285.2, 101.761, 243, 605

(56) References Cited

U.S. PATENT DOCUMENTS

| | | | |
|---|---|---|---|
| 3,966,128 A | 6/1976 | Anderson et al. | |
| 4,106,706 A | 8/1978 | Burrows | |
| 4,134,554 A | 1/1979 | Morlock | |
| 4,773,601 A | 9/1988 | Urich et al. | |
| 4,982,904 A | * 1/1991 | Greiner | 241/73 |
| 5,207,391 A | 5/1993 | Anderson | |
| 5,570,849 A | 11/1996 | Anderson | |
| 6,260,778 B1 | 7/2001 | Wenger | |

FOREIGN PATENT DOCUMENTS

DE              3813908      * 11/1989   .................. 241/73

* cited by examiner

Primary Examiner—Mark Rosenbaum
(74) Attorney, Agent, or Firm—François Martineau

(57) ABSTRACT

A hay chopper is used for chopping elongated stems of hay into small fragments. The hay chopper comprises two superimposed screens comprising an identical set of slots recessed thereon. When the two screens are well aligned, effective slot windows result from the superimposition of slots from each one of the screens. A chopping element is also provided within the hay chopper, this chopping element comprising sharp-edged blades emerging periodically from underneath said screens through said effective slot windows, in order to cut the hay located onto the chopping element of the hay chopper. By varying the alignment between the two screens, the effective slot windows' width can be adjusted accordingly. It is the width of these slots that will determine approximately the length of the chopped fragments of hay that is allowed to slip therethrough by gravity and/or drive force from the rotating blades.

20 Claims, 7 Drawing Sheets

HAY CHOPPER FOR ANIMAL FEED

FIELD OF THE INVENTION

The present invention relates to material processors used to reduce the particle size of bulk material. More particularly, this invention relates to hay chopping devices used to chop full-sized stems of hay into smaller fragments.

BACKGROUND OF THE INVENTION

Balanced healthy diet mixtures fed to cattle are based on both hay and grain. The hay from the mixture has an essential role in the cattle's digestion. However, cattle animals prefer grain to hay, and if the mixture is not homogeneous enough, the animals are able to discriminate between the hay and the grain with their tongue, and are therefore able to eat only the grain. Accordingly, the hay has to be cut short enough in order for the hay and the grain to mix properly, and to make it harder for the cattle to leave out the hay from the mixture.

In order for the hay to be suitably chopped, chopping devices exist in various forms. However, these chopping devices are generally crude and in want of improvement.

OBJECT OF THE INVENTION

The main object of the invention is to provide a hay chopping device that will cut hay stacks efficiently while providing resulting cut hay pieces of a size that cannot be discriminated by the cattle relative to grain.

SUMMARY OF THE INVENTION

The present invention relates to a hay chopper for chopping elongated strands of hay into shorter hay fragments, comprising:

a main support frame;

a hay container mounted over said main support frame having an enclosure for containing hay strands fed to said hay chopper;

a chopping element for chopping hay strands contained in said hay container, said chopping element mounted to said main support frame and having an operative face opening into said hay container enclosure, said chopping element comprising a restrainer element composed of a pair of superimposed screens similar to one another, each one of said screens comprising a plurality of spaced-apart elongated slots thereon, wherein when paid screens are superimposed, effective slot windows results from the alignment of registering pairs of said slots from said screens; said chopping element further including a pair of rails mounted onto said main support frame, said screens being mounted onto said rails whereon said screens are slideably moveable; wherein by unaligning said screens, and hence setting an unalignement value, the width of said effective slots is adjustable; said chopping element further comprising actuated shearing blades for slicing hay in touch with said operative face of said chopping element by emerging substantially periodically from underneath said restrainer element through said effective slot windows;

a chopping element adjuster comprising a controller, for adjusting said unalignement value between said screens, whereby the width of said effective slots is adjustable;

an outlet compartment operatively connected to said chopping element and towards which hay is forwarded;

wherein the elongated strands of hay inserted in said container and located onto said operative face of said chopping element are chopped when said actuated blades emerge from underneath said restrainer element through said slot windows, and wherein the shorter hay fragments are sized to bypass said chopping element, in order to pass through said effective slot windows of said chopping element.

In one embodiment, the hay chopper further comprises an auger closely fitted in said outlet compartment, said auger being actuated and conveying the shorter hay fragments forwarded to said outlet compartment outwardly thereof.

In one embodiment, said hay container is a silo.

In one embodiment, said chopping element is located on a platform integral to said main support frame, wherein said silo is cylindroid and is rotatable about its longitudinal axis, and wherein said silo is arranged onto said platform in order for the latter to circumscribe said chopping element, said chopping element extending radially into said silo enclosure and being substantially smaller than said platform, and wherein said chopping element is arranged eccentrically relative to the contour of said platform, an inner end of said chopping element being located in the center area of said platform, and a radially outer end of said chopping element being located radially outwardly of said silo enclosure; wherein the rotatable silo enables said chopping element to tangentially sweep the entire area circumscribed by the contour of said silo, and can hence reach all the elongated hay strands located at the base of said silo.

In one embodiment, said chopping element adjuster is an articulated connecting link comprising an intermediate section mounted to said platform, a handle at a first extremity thereof, by which said connecting link can be maneuvered to adjust said unalignement value, and a second extremity of said articulated connecting link being attached to said screens; wherein said second extremity comprises two branches, each branch being pivotally attached to said screens, and wherein by maneuvering said handle, said branches will slideably displace of one said screen relative to the other onto said rails, this displacement inducing the width adjustment of said effective slot windows.

In one embodiment, each of said slots has a rectangular geometry.

In one embodiment, one of said actuated blades is progressively in register with each one of said effective slot windows; wherein said screens are provided with a greater concentration of slots towards a radially outer edge thereof, hence providing said chopping element with more of said actuated blades towards said radially outer edge thereof.

In one embodiment, said actuated blades are radially carried onto a rotary cylindrical drum, and wherein by rotating, said drum will induce a rotary travel of the blades.

The present invention also relates to a chopping element for use on a hay chopper destined to chop elongated strands of hay contained in an enclosure of a hay container into shorter hay fragments, said chopping element having an operative face opening into said hay container enclosure, said chopping element comprising:

a restrainer element composed of two superimposed screens similar to one another, each one of said screens comprising a plurality of spaced-apart slots thereon, wherein when screens are superimposed, effective slot windows results from the alignment of two corresponding said slots from said screens; wherein by unaligning said screens, and hence setting an unalignement value, the width of said effective slot windows is adjustable;

actuated blades for slicing elongated strands of hay in touch with said operative face of said chopping element by emerging substantially periodically from underneath said screens through said effective slot windows;

a chopping element adjuster comprising a controller for adjusting said unalignement value between said screens, whereby the width of said effective slot windows is adjustable.

The present invention also relates to, in combination:

a rigid main frame defining a through-channel, said through-channel for free flow of aggregate material from an input side to an outlet side thereof;

a knife member mounted to said main frame and extending transversely through a fraction of said through-channel, said knife member having a leading edge, located about said input side of said through channel, and an output, located about said outlet side of said through-channel, said knife member for shearingly fragmenting the aggregate material into finer particulate material; and a screen member, mounted to said main frame and extending through the full of said through-channel and cooperating with said knife member in enabling free passage therethrough of the finer particulate material exclusively of the aggregate material;

wherein said screen member includes a first grate and a second grate, each of said first grate and second grate including a number of slots, and relative motion means for adjustably moving said first grate relative to said second grate for registering said slots from said first grate at least partly with said slots from said second grate, wherein a specific size of the finer particulate material screened by said screen member is controlled by said relative motion means.

In one embodiment, the combination further includes a conveyor member, mounted to said main frame about said through-channel outlet side, said conveyor member for conveying the finer particulate material from said knife member output to a remote area.

In one embodiment, said relative motion means includes a link rod assembly, pivotally mounted to said main frame, and a handle integral to said link rod assembly, said handle enabling an operator to manually adjust said specific size of the finer particulate material screened by said screen member.

In one embodiment, each of said first grate and of said second grate is of a similar generally planar, wavy shape.

In one embodiment, said knife member includes a number of shearing blades, said shearing blades extending through the registering said slots from said first grate and said second grate, a fraction of said first grate and a corresponding fraction of said second grate having a larger concentration of said slots and associated said shearing blades than the remaining portion of said first grate and said second grate.

DETAILED DESCRIPTION OF THE EMBODIMENTS

Figure 1:
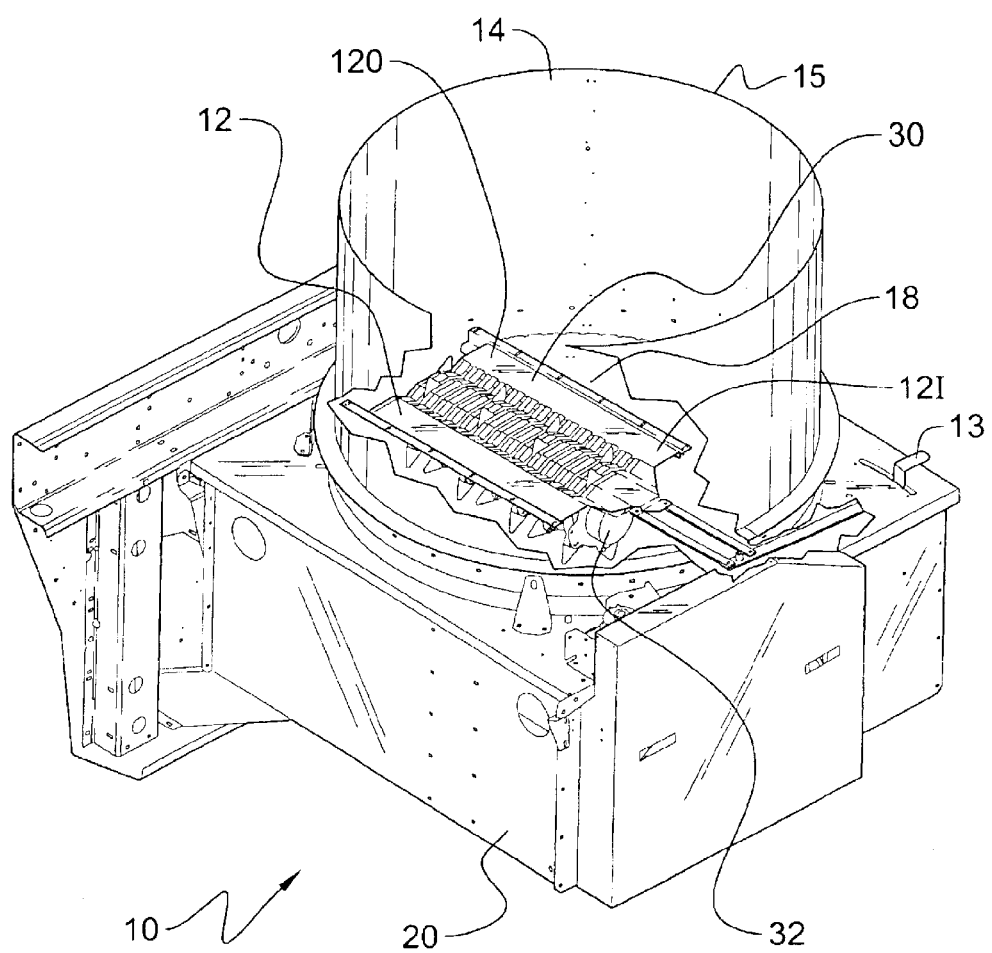
FIG. 1 is a perspective view of the hay chopper according to the invention, the walls of a silo being partly removed for better showing the chopping element of the hay chopper.

With further reference to the drawings, FIG. 1 shows a hay chopper 10 according to one embodiment of the present invention. Hay chopper 10 is used for chopping elongated stems of hay into small fragments. Hay chopper 10 can be maneuvered by an operator to set the length of the resulting chopped fragments of hay.

Figure 2:
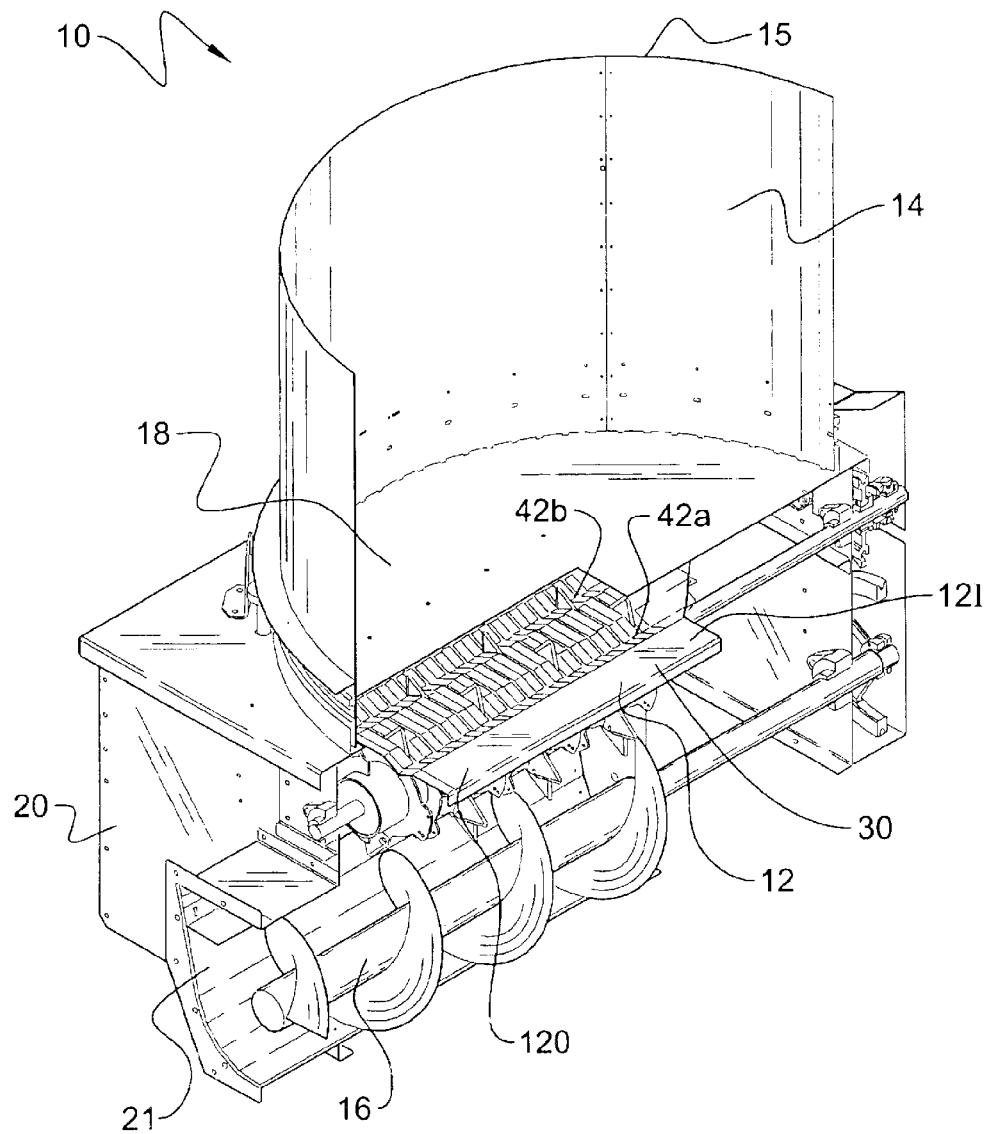
FIG. 2 is a perspective cross-sectional view of the hay chopper showing the endless screw conveyor for feeding the cut hay pieces to the grain mixer.
Figure 3:
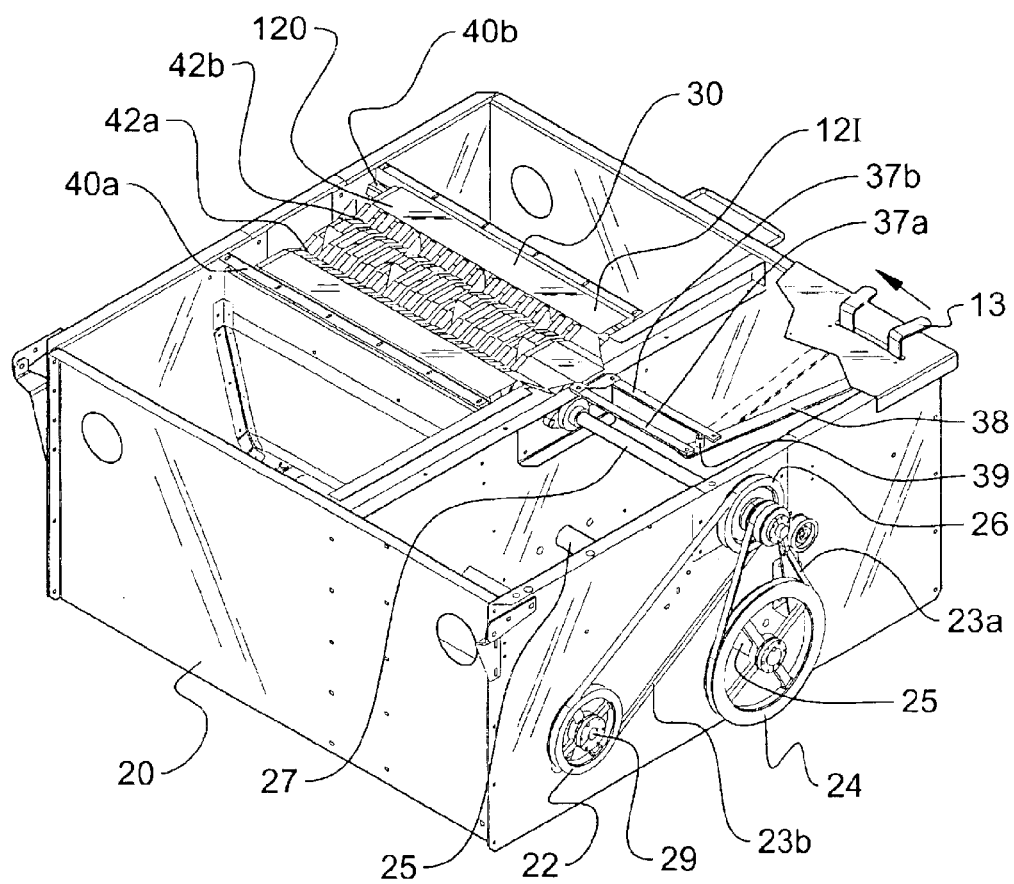
FIG. 3 is a partial perspective view of the hay chopper of FIG. 1, with the top platform of the body and the silo removed for better showing the mechanism of the chopping element.
Figure 4:
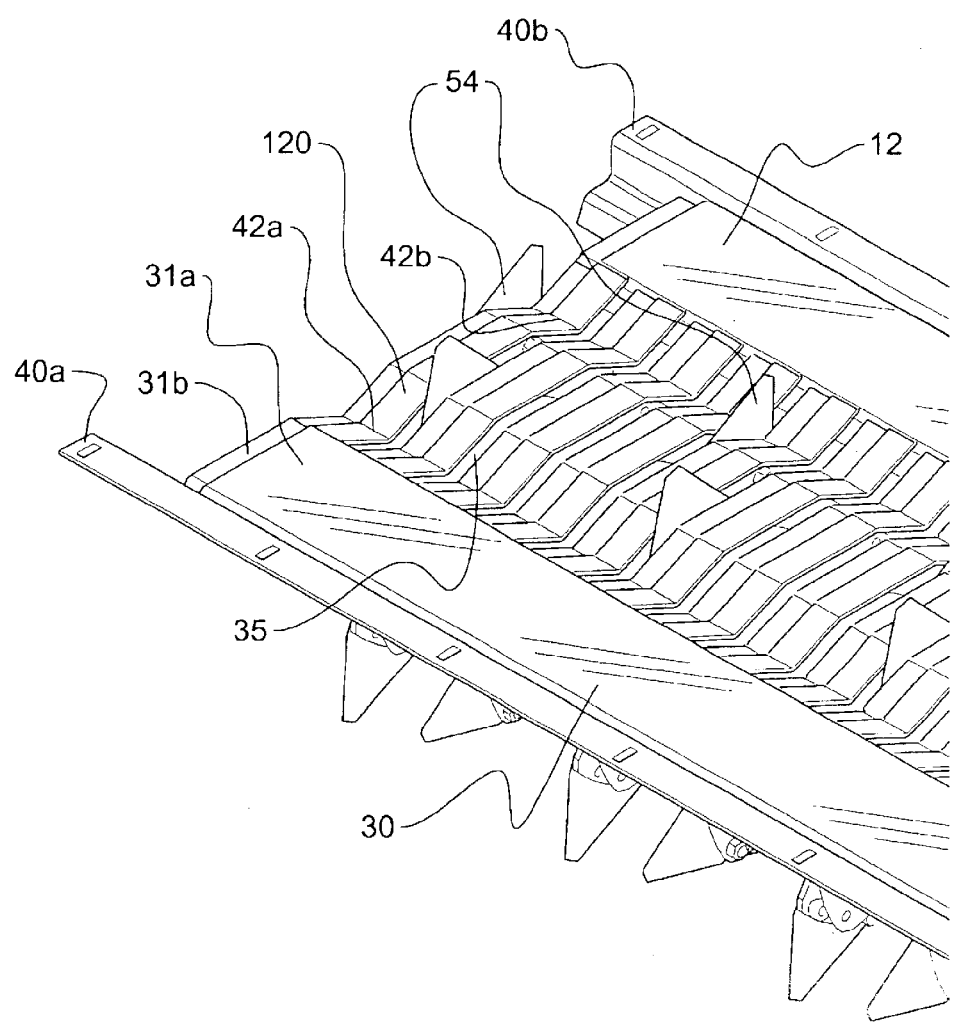
FIG. 4 is a partial perspective view focusing on the chopping element of the hay chopper, at an enlarged scale relative to FIG. 1.

Hay chopper 10 comprises a chopping element 12 fixedly attached to an underlying main frame or body 20, a handle 13 for maneuvering chopping element 12, and a cylindroid upright silo 14 resting on top of body 20, the base of silo 14 circumscribing chopping element 20. Silo 14 is used for receiving and containing hay or stacks of hay and for guiding them to chopping element 12. Hay chopper 10 also defines an inner platform 18 being the top part of body 20 circumscribed within the contour of silo 14. As illustrated in FIG. 2, there is further disclosed an auger 16 having a section thereof beneath the base of silo 14. Endless screw conveyor or auger 16 is for moving cut hay away from hay chopper 10.

Figure 9:
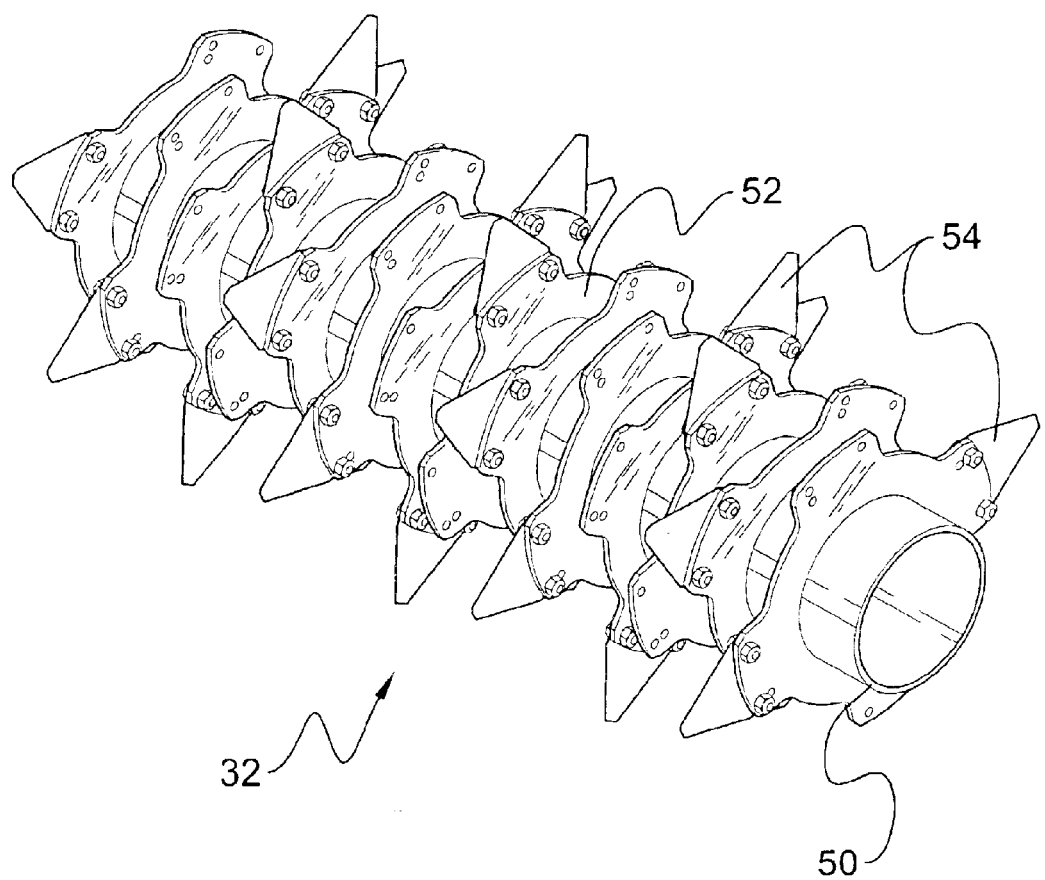
FIG. 9 is an enlarged perspective view of the rotor from the chopping element of the hay chopper of FIG. 1, according to one embodiment of the invention.

Chopping element 12 comprises a restrainer element 30 and a rotor 32 (FIG. 9). In one embodiment, as illustrated in FIG. 9, rotor 32 is composed of a cylindrical drum 50, around which a plurality of discs 52 are spacedly coaxially arranged. Discs 52 each comprise two triangular blades 54 having sharp edges destined to cut through stems of hay fed to hay chopper 10. Rotor 32 is power-driven into rotation as hereinafter set forth.

Restrainer element 30 comprises two superimposed screens 31a and 31b, screen 31a resting on top of screen 31b. Both screens 31a, 31b, each comprise on their longitudinal edges two downwardly depending shoulders 41a, 41b (FIG. 7) and rest thereby onto rails 40a and 40b (FIG. 5), which are integral or fixedly attached to body 20. In the embodiments of the invention shown in the annexed drawings, screens 31a and 31b have a very similar geometry, which differs only whereby screen 31a is narrower than screen 31b, in order for screen 31a to fit snuggly over screen 31b. Screens 31a and 31b can slideably move along rails 40a and 40b, along their longitudinal axis, and the position of screen 31a relatively to screen 31b can be selectively adjusted by maneuvering handle 13, as will be explained hereinbelow. Now referring to FIGS. 7 and 8, superimposed screens 31a and 31b comprise rectangular slots 34, arranged in a spaced-apart relationship. Screens 31a, 31b being superimposed, an effective slot window 35 result from the superimposition of two registering slots 34, 34 from both screens 31a, 31b. Screens 31a, 31b are said to be "aligned" when slots 34, 34 on screen 31a are all in substantially perfect matching register with slots from screen 31b, and wherein effective slot windows 35 from restrainer element 30 thus have a maximal width. If screens 31a, 31b are not aligned, they are said to be "unaligned", and an "unalignment value" follows that definition, which is the offset value between screens 31a and 31b.

Figure 5:
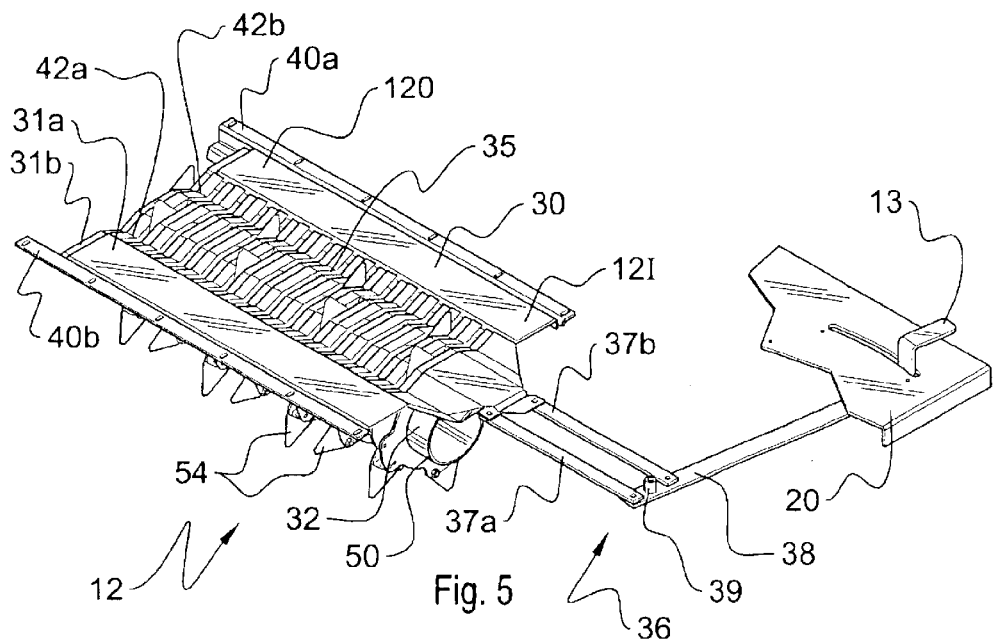
FIG. 5 is a perspective view of the chopping element of the hay chopper at an enlarged scale relative to FIG. 1, and further showing a handle in one limit position and a broken-edged part of the body of the hay chopper.
Figure 6:
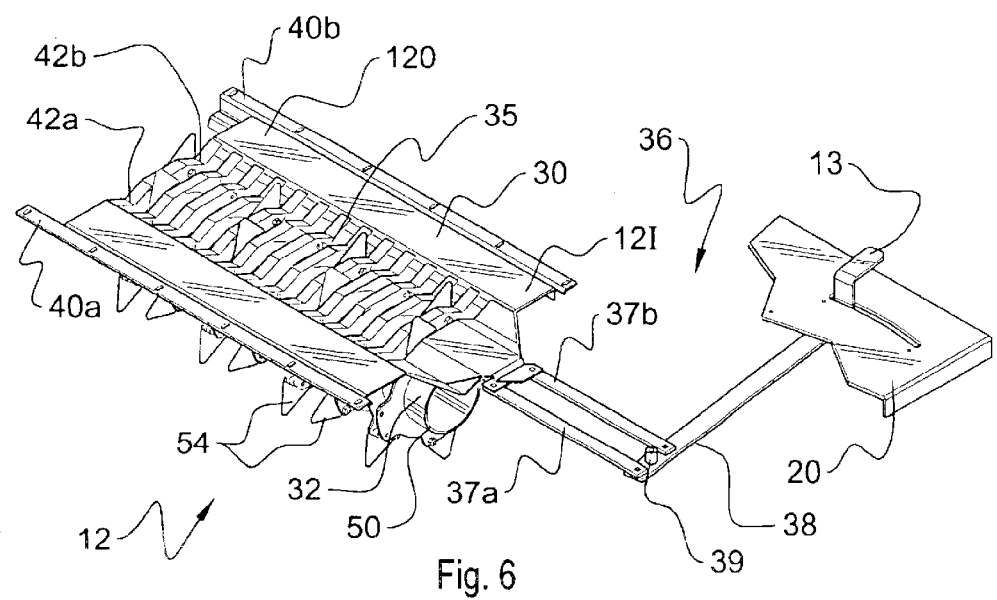
FIG. 6 is a view similar to FIG. 5, but showing the handle in another limit position.
Figure 7:
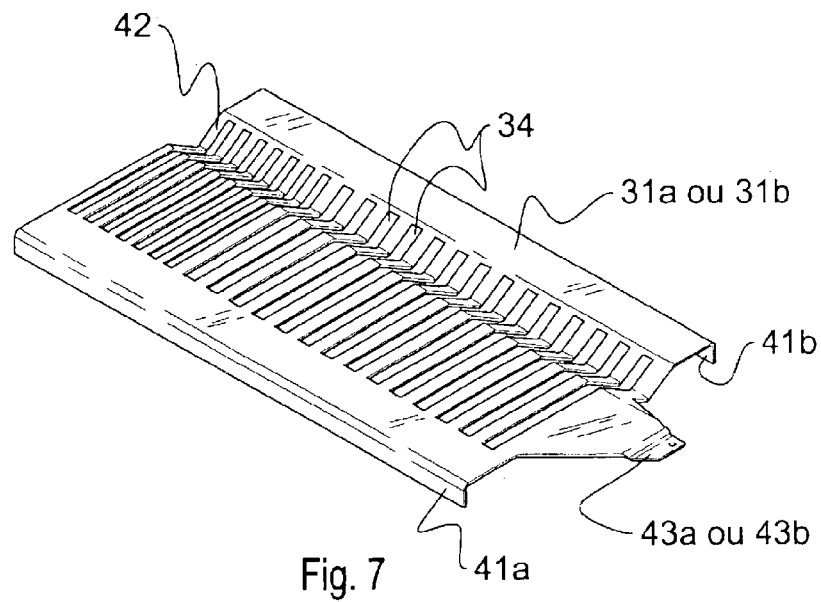
FIG. 7 is an enlarged perspective view of a screen of the chopping element of the hay chopper according to one embodiment of the invention.

In FIGS. 5, 6 and 7, handle 13 is located at one end of a connecting link 36, which comprises two rods 37a, 37b, and an arm 38. Rod 37a is pivotally fixedly attached to one of its extremities to a small tongue 43a located on a lateral edge of screen 31a, and is pivotally fixedly attached to one end portion of arm 38 at its other extremity. Analogously, rod 37b is pivotally fixedly attached by one of its extremities to a small tongue 43b located on a lateral edge of screen 31b, and is pivotally fixedly attached to one end portion of arm 38 at its other extremity. Handle 13 is located at the end portion of arm 38 opposite to the end portion whereon rods 37a and 37b are attached. Arm 38 is pivotable about a stud 39, which is, in one embodiment, pivotally anchored into the top plate of body 20. An articulated connecting link 36 hence results from the assembly of rods 37a and 37b, arm 38, and the pivotal anchoring of stud 39 in body 20. In FIG. 6, handle 13 is in a first limit position, wherein screens 31a, 31b are in their so-called aligned position. In this position, effective slot window 35 has a maximal width. If handle 13 is manipulated in order for arm 38 to pivot towards a second limit position, rod 37b will slideably displace screen 31b away from stud 39 along rails 40a, 40b, and rod 37a will slideably displace screen 31a towards stud 39 along rails 40a, 40b; both screens 31a, 31b will hence be offset one relative to the other, and their unalignment value will increase. In FIG. 5, handle 13 is in the second limit position wherein both screens 31a, 31b are as offset as they can be one relative to the other, wherein the unalignment value is maximal, and where effective slot window 35 has a minimal width.

The effective slot window value is function of the thickness of each blade 54, and of the desired size of the cut hay pieces.

Rotor 32 and restrainer element 30 are joined in order for element 30 to cover rotor 32. Slot windows 35 are spaced apart similarly to discs 52. When element 30 and rotor 32 are joined, each disc 52 is perfectly aligned with a corresponding slot window 35 of restrainer element 30. When rotor 32 is driven into rotation, blades 54 periodically emerge from underneath restrainer element 30 through slot windows 35 in a rotary travel, and are consequently able to slice through stem of hay located on top of restrainer element 30. The face of chopping element 12 whereby blades 54 emerge, and whereby the hay is located before getting sliced through, will be referenced to in the foregoing specification and in the appended claims as the operative face of chopping element 12.

While the hay is being sliced, fragments of hay being short enough to pass through slot windows 35, which have been adjusted to a chosen width, can pass freely therethrough under the influence of gravity borne forces. It has been empirically noted that about 97% of the sliced hay passing through restrainer element 30 had the desired length. It is not necessary to obtain 100% accuracy, since cost is a factor in farm operations.

After the hay has been sliced and has bypassed restrainer element 30, it arrives in compartment room 21, wherein an auger 16 is located. Auger 16, power-driven into rotation by means described hereinafter, is destined to convey the chopped hay to a hay-grain mixing device (not shown), for example. Auger 16 is closely fitted into compartment room 21, in the sense that the exterior edge of the thread from auger 16 is tightly fitted to the inner contour of the compartment room 21. The amount of hay fragments escaping from the conveying action of auger 16, from the gap formed between the exterior edge of its thread and the inner periphery of compartment room 21, is consequently substantially reduced.

In one embodiment, a single power-driving means is used to actuate both auger 16 and rotor 32. A shaft 25, itself actuated by a motor (not shown), drives wheel 24. Wheel 24 is linked to a diametrically smaller wheel 26 with an endless belt 23a, and wheel 26 is linked to another diametrically smaller wheel 22 with an endless belt 23b. The rotary motion from wheel 24 is hence transferred to wheel 26, and further from wheel 26 to wheel 22. A shaft 27 extends from the center of cylindrical drum 50 of rotor 32 and is fixedly attached to the center of wheel 26. A shaft 29 rotatably carries wheel 22. Shafts 25, 27, 29 are parallel to one another and are supported by body 20. The extremity of the shank of auger 16 is fixedly attached to wheel 22. When wheel 24 is actuated, the actuation is hence transmitted to auger 16 and rotor 32. Alternative suitable actuation mechanisms, as known in the art, could have been used to actuate rotor 32 and auger 16.

Figure 8:
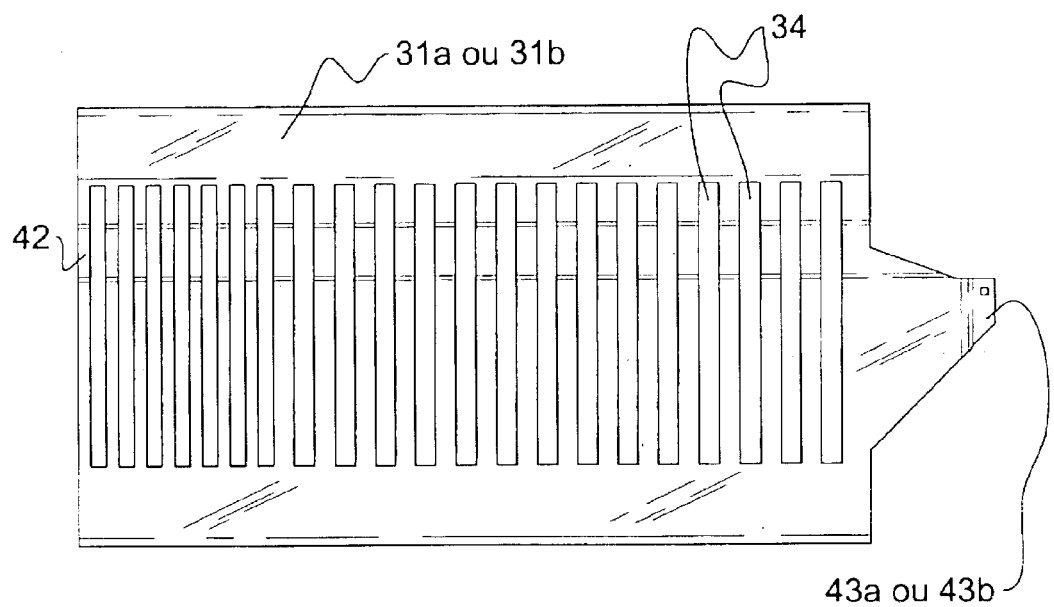
FIG. 8 is a top elevational view of the screen of FIG. 7, at an enlarged scale relative to FIG. 7.

As shown in FIGS. 2, 7, chopping element 12 is eccentrically positioned relative to cylindroid upright silo 14. One of its lateral edges, that we will now on refer to as the outer edge, is closer to the inner periphery of silo 14; a radially outer end portion 12O of chopping element 12 follows that definition. The opposite edge of screens 31a, 31b, where small tongues 43a or 43b are located will be now on referred to as the inner edge, which is located around the center area of the base of silo 14; an inner end portion 12I of chopping element 12 follows that definition. As shown in FIGS. 7 and 8, rectangular slots 34 of screens 31a, 31b may have their width progressively decreasing from the inner edge to the outer edge of chopping element 12, and the gap between each successive pair of slot windows 35 decreases progressively as one moves from the intermediate portion towards outer end portion 12O of chopping element 12. Since a disc 52 (FIG. 9) registers with each slot window 35, the concentration of discs 52, and consequently of blades 54 increases towards the outer edge portion of chopping element 12. Indeed, when hay is stacked in silo 14, the hay of the radial outer edge portion 12O of the inner chamber silo 14 will tend to be more compacted than the hay located closer to the center area of silo 14, because of conventional rotation of the silo walls 14, and consequently centrifugal force applied to the hay inside the inner chamber of silo 14. Since the concentration of discs 52 and blades 54 is higher towards the radially outer edge portion 12O of restrainer element 30, hay chopper 10 can slice without excessive resistance through the compacted hay located peripherally.

While hay chopper 10 is active, silo 14 rotates about its central axis. Chopping element 12 radially sweeps the area circumscribed within the perimeter of silo 14. All the hay contained at the base of silo 14 can hence be reached by chopping element 12. Outer end portion 12O sweeps the inner peripheral area of silo 14, and the inner end portion 12I of chopping element 12 sweeps the base center area of silo 14.

Silo 14 rotates about its longitudinal axis in the customary fashion. The rotation of silo 14 is not an object of the present invention, and will therefore not be further discussed.

Hay is inserted into silo 14 through top inlet opening 15. The hay is then carried downwardly towards platform 18 under the influence of gravity-borne forces, and is guided downwardly by the walls of cylindroid upright silo 14. When a specific hay batch reaches platform 18 and is sheared by chopping element 12 which has previously been activated, it gets sliced by sharp-edged blades 54 rotatably travelling about the central axis of cylindrical drum 50. If silo 14 is filled with hay, the hay batch located at its base will be reached when it gets to platform 18, since silo 14 rotates constantly about its central axis, and chopping element 12 is hence able to reach all the hay located in the area circumscribed within the inner perimeter of silo 14. Hay located around the peripheral area of cylindroid silo 14 is more compact than hay located around the center area of silo 14. More blades have preferably been provided around the radially outer edge of chopping element 12, which sweeps the peripheral area of silo 14, and is therefore able to slice through the compacted hay. When the hay stems have been cut to the desired size and are small enough to bypass restrainer element 30 under the influence of gravity borne forces, and/or under the influence of the rotary motion of rotor 32, they slip through slot windows 35, which have been previously adequately widened or narrowed by maneuvering handle 13, and get to compartment room 21 through slot windows 35, wherein rotating auger 16 is located. Auger 16 forms an endless linear conveyor that conveys the hay bits out of register from hay chopper 10, to another device for example, like a hay-and-grain mixer (not shown).

Some fragments of hay which are longer than slot windows 35 are wide, can pass through slot windows 35, if they are suitably directed, for example, if they are directed parallel or substantially parallel to slot windows 35. Nevertheless, a little amount of inappropriately long fragments of hay bypass restrainer element 30 (around 3%), and this is acceptable to keep total overhead costs at a manageable level.

Unexpectedly, hay chopper 10 has been found to be particularly effective in chopping square-sectioned and disc-sectioned stacks of hay. Moreover, the amount of dust resulting from chopping the hay has been found to be substantially decreased in this system, since the chopping and the conveying of the hay is all done in closed compartments which do not communicate with the exterior environment. The mixture is outlet of the mechanism after all the volatile dust resulting from cutting the hay has settled, hence reducing health problems with the staff operating around this device, and further reducing fire hazards engendered by hay dust, which is known to be excessively inflammable.

In one embodiment, screens 31a, 31b each present a concavity 42 transversely to slots 34, as shown in FIGS. 7, 8. This feature has been found to provide hay chopper 10 better efficiency in chopping stems of hay having a high moisture content.

Chopping element 12 could have alternate designs. The cutting means in the above-described embodiments is a rotor 32 carrying a plurality of sharp-edged blades 54. Other embodiments could exist wherein the cutting means would be a plurality of blades mounted onto supports able to slide back and forth onto a railing system, each rail being aligned underneath each slot window 35, perpendicularly relative to the longitudinal axis of restrainer element 30, and wherein the support would be actuated in a reciprocating motion, in order for the blades to emerge periodically from underneath restrainer element 30 in a translational motion, and hence slicing through the hay located onto the chopping element 12. More generally, any suitable shearing means could be used to slice through the hay, without departing from the scope of the present invention.

In another embodiment, screens 31a, 31b could be designed otherwise. There could be two concavities 42aa and 42b on each screen 31a, 31b, as illustrated in FIGS. 1–6, instead of having only a single concavity 42, as illustrated in FIGS. 7 and 8. However, concavities 42, 42a, 42b are not essential to the operation of the present invention.

Other screen alignment adjusting means could be used instead of using connecting link 36. An electric motor and a set of sprocket wheels and chains could be arranged as known in the art, to displace screens 31a, 31b along rails 40a, 40b. More generally, any actuating mechanism as known in the art could be used to adjust the alignment between screen 31a and screen 31b, without departing from the scope of the present invention.

The present invention may, of course, be carried out in other specific ways than those herein set forth without departing from the spirit and essential characteristics of the invention. The present embodiments are, therefore, to be considered in all respect illustrative and not restrictive and all changes coming within the meaning and equivalency range are intended to be embraced herein.

What is claimed is:

1. A hay chopper for chopping elongated strands of hay into shorter hay fragments, comprising:

a main support frame;

a hay container mounted over said main support frame having an enclosure for containing hay strands fed to said hay chopper;

a chopping element for chopping hay strands contained in said hay container, said chopping element mounted to said main support frame and having an operative face opening into said hay container enclosure, said chopping element comprising a restrainer element composed of a pair of superimposed screens similar to one another, each one of said screens comprising a plurality of spaced-apart elongated slots thereon, wherein when said screens are superimposed, effective slot windows results from the alignment of registering pairs of said slots from said screens; said chopping element further including a pair of rails mounted onto said main support frame, said screens being mounted onto said rails whereon said screens are slideably moveable; wherein by unaligning said screens, and hence setting an unalignement value, the width of said effective slots is adjustable; said chopping element further comprising actuated shearing blades for slicing hay in touch with said operative face of said chopping element by emerging substantially periodically from underneath said restrainer element through said effective slot windows;

a chopping element adjuster comprising a controller, for adjusting said unalignment value between said screens, whereby the width of said effective slots is adjustable;

an outlet compartment operatively connected to said chopping element and towards which hay is forwarded;

wherein the elongated strands of hay inserted in said container and located onto said operative face of said chopping element are chopped when said actuated blades emerge from underneath said restrainer element through said slot windows, and wherein the shorter hay fragments are sized to bypass said chopping element, in order to pass through said effective slot windows of said chopping element.

2. A hay chopper as defined in claim 1, further comprising an auger closely fitted in said outlet compartment, said auger being actuated and conveying the shorter hay fragments forwarded to said outlet compartment outwardly thereof.

3. A hay chopper as defined in claim 1, wherein said hay container is a silo.

4. A hay chopper as defined in claim 3, wherein said chopping element is located on a platform integral to said main support frame, wherein said silo is cylindroid and is rotatable about its longitudinal axis, and wherein said silo is arranged onto said platform in order for the latter to circumscribe said chopping element, said chopping element extending radially into said silo enclosure and being substantially smaller than said platform, and wherein said chopping element is arranged eccentrically relative to the contour of said platform, an inner end of said chopping element being located in the center area of said platform, and a radially outer end of said chopping element being located radially outwardly of said silo enclosure; wherein the rotatable silo enables said chopping element to tangentially sweep the entire area circumscribed by the contour of said silo, and can hence reach all the elongated hay strands located at the base of said silo.

5. A hay chopper as defined in claim 1, wherein said chopping element adjuster is an articulated connecting link comprising an intermediate section mounted to said platform, a handle at a first extremity thereof, by which said connecting link can be maneuvered to adjust said unalignment value, and a second extremity of said articulated connecting link being attached to said screens; wherein said second extremity comprises two branches, each branch being pivotally attached to said screens, and wherein by maneuvering said handle, said branches will slideably displace of one said screen relative to the other onto said rails, this displacement inducing the width adjustment of said effective slot windows.

6. A hay chopper as defined in claim 1, wherein each of said slots has a rectangular geometry.

7. A hay chopper as defined in claim 1, wherein one of said actuated blades is progressively in register with each one of said effective slot windows; wherein said screens are provided with a greater concentration of slots towards a radially outer edge thereof, hence providing said chopping element with more of said actuated blades towards said radially outer edge thereof.

8. A hay chopper as defined in claim 1, wherein said actuated blades are radially carried onto a rotary cylindrical drum, and wherein by rotating, said drum induces a rotary travel of the blades.

9. A chopping element for use on a hay chopper destined to chop elongated strands of hay contained in an enclosure of a hay container into shorter hay fragments, said chopping element having an operative face opening into said hay container enclosure, said chopping element comprising:
    a restrainer element composed of two superimposed screens similar to one another, each one of said screens comprising a plurality of spaced-apart slots thereon, wherein when screens are superimposed, effective slot windows results from the alignment of two corresponding said slots from said screens; wherein by unaligning said screens, and hence setting an unalignement value, the width of said effective slot windows is adjustable;
    actuated blades for slicing elongated strands of hay in touch with said operative face of said chopping element by emerging substantially periodically from underneath said screens through said effective slot windows;
    a chopping element adjuster comprising a controller for adjusting said unalignement value between said screens, whereby the width of said effective slot windows is adjustable.

10. A chopping element as defined in claim 9, wherein said chopping element adjuster is an articulated connecting link comprising an intermediate section, mounted to said platform, a handle at a first extremity thereof, by which said connecting link can be maneuvered to adjust said unalignment value, and a second extremity of said articulated connecting link being attached to said screens; wherein said second extremity comprises two branches, each branch being pivotally attached to said screens, and wherein by maneuvering said handle, said branches will slideably displace one said screen relative to the other onto said rails, this displacement inducing the width adjustment of said effective slot windows.

11. A chopping element as defined in claim 9, wherein each of said slots has a rectangular geometry.

12. A chopping element as defined in claim 9, wherein said screens are provided with a greater concentration of slots towards the radially outer edge thereof, hence providing said chopping element with a greater number of said actuated blades towards said radially outer edge thereof.

13. A chopping element for use on a hay chopper destined to chop elongated strands of hay contained in a hay container into short fragments, said chopping element having its operative face opening into said hay container, said chopping element comprising:
    a restrainer element composed of at least two superimposed screens similar to one another, each one of said screens comprising a plurality of spaced-apart slots thereon, wherein when screens are superimposed, effective slot windows result from the alignment of two corresponding said slots from said screens; wherein by unaligning said screens, and hence setting an unalignement value, the width of said effective slots is adjustable;
    cutting means for cutting hay in touch with said operative face of said chopping element by emerging substantially periodically from underneath said screens through said effective slot windows;
    chopping element adjusting means comprising a controller for adjusting said unalignment value between said screens, whereby the width of said effective slot windows is adjustable.

14. A chopping element as defined in claim 13, wherein each of said slots has a rectangular geometry.

15. A chopping element as defined in claim 13, wherein said screens are provided with a greater concentration of slots towards the radially outer edge thereof, hence providing said chopping element with more of said actuated blades towards said radially outer edge thereof.

16. In combination:
    a rigid main frame defining a through-channel, said through-channel for free flow of aggregate material from an input side to an outlet side thereof;
    a knife member mounted to said main frame and extending transversely through a fraction of said through-channel, said knife member having a leading edge, located about said input side of said through channel, and an output, located about said outlet side of said through-channel, said knife member for shearingly fragmenting the aggregate material into finer particulate material; and
    a screen member, mounted to said main frame and extending through the full of said through-channel and cooperating with said knife member in enabling free passage therethrough of the finer particulate material exclusively of the aggregate material;
    wherein said screen member includes a first grate and a second grate, each of said first grate and second grate including a number of slots, and relative motion means for adjustably moving said first grate relative to said second grate for registering said slots from said first grate at least partly with said slots from said second grate, wherein a specific size of the finer particulate material screened by said screen member is controlled by said relative motion means.

17. A combination as in claim 16, further including a conveyor member, mounted to said main frame about said through-channel outlet side, said conveyor member for conveying the finer particulate material from said knife member output to a remote area.

18. A combination as in claim 16, wherein said relative motion means includes a link rod assembly, pivotally mounted to said main frame, and a handle integral to said link rod assembly, said handle enabling an operator to manually adjust said specific size of the finer particulate material screened by said screen member.

19. A combination as in claim 16, wherein each of said first grate and of said second grate is of a similar generally planar, wavy shape.

20. A combination as in claim 16, wherein said knife member includes a number of shearing blades, said shearing blades extending through the registering said slots from said first grate and said second grate, a fraction of said first grate and a corresponding fraction of said second grate having a larger concentration of said slots and associated said shearing blades than the remaining portion of said first grate and said second grate.

* * * * *